US011470165B2

United States Patent
Yankovich et al.

(10) Patent No.: US 11,470,165 B2
(45) Date of Patent: Oct. 11, 2022

(54) SYSTEM, METHOD, AND MEDIUM FOR GENERATING PHYSICAL PRODUCT CUSTOMIZATION PARAMETERS BASED ON MULTIPLE DISPARATE SOURCES OF COMPUTING ACTIVITY

(71) Applicant: eBay, Inc., San Jose, CA (US)

(72) Inventors: Steve Yankovich, San Jose, CA (US); Sergio Pinzon Gonzales, Jr., San Jose, CA (US)

(73) Assignee: eBay, Inc., San Jose, CA (US)

( * ) Notice: Subject to any disclaimer, the term of this patent is extended or adjusted under 35 U.S.C. 154(b) by 218 days.

(21) Appl. No.: 16/040,369

(22) Filed: Jul. 19, 2018

(65) Prior Publication Data

US 2019/0251613 A1 Aug. 15, 2019

Related U.S. Application Data

(60) Provisional application No. 62/630,192, filed on Feb. 13, 2018.

(51) Int. Cl.
*G06Q 30/00* (2012.01)
*H04L 67/306* (2022.01)
(Continued)

(52) U.S. Cl.
CPC ........ *H04L 67/306* (2013.01); *G06F 16/9535* (2019.01); *G06N 20/00* (2019.01);
(Continued)

(58) Field of Classification Search
CPC ........... G06Q 30/0621; G06Q 30/0641; G06Q 10/083; G06Q 30/0643; G06Q 50/01; H04L 67/306; H04L 67/33
(Continued)

(56) References Cited

U.S. PATENT DOCUMENTS 6,266,649 B1 7/2001 Linden et al.
7,987,182 B2 7/2011 Slothouber et al.
(Continued)

FOREIGN PATENT DOCUMENTS

CN 105867610 A 8/2016
WO 2007055618 A2 5/2007
(Continued)

OTHER PUBLICATIONS

Hermanek, P., Ferrucci, M., Dewulf, W., Carmignato, S., Optimized reference object for assessment of computed tomography instrument geometry, 2017, 7th Conference on Industrial Computed Tomography, pp. 1-2. (Year: 2017).*

(Continued)

*Primary Examiner* — Jeffrey A. Smith
*Assistant Examiner* — Brittany E Bargeon
(74) *Attorney, Agent, or Firm* — FIG. 1 Patents

(57) ABSTRACT

An enhanced product customization service to automatically generate product customization parameters for customizing a product for a user in accordance with an interest of the user. Signals received from various sources are analyzed to identify an interest of the user and search queries that are generated by the user are also analyzed to identify an intention of the user to acquire a product. Then, based on having identified both the interest of the user and the intention of the user to acquire the product, product customization parameters are generated for customizing a physical characteristic of the product in accordance with the identified interest. In this way, embodiments of the enhanced product customization service may be deployed to customize a product for a user preemptively even without the user expressly indicating a specific interest in such a customized product.

20 Claims, 7 Drawing Sheets

(51) Int. Cl.
| | |
|---|---|
| *G06Q 30/06* | (2012.01) |
| *G06N 20/00* | (2019.01) |
| *G06Q 30/02* | (2012.01) |
| *G06Q 50/04* | (2012.01) |
| *G06V 20/20* | (2022.01) |
| *G06V 20/80* | (2022.01) |
| *G06V 40/20* | (2022.01) |
| *H04L 67/50* | (2022.01) |
| *G06F 16/9535* | (2019.01) |
| *G06Q 10/08* | (2012.01) |
| *G06Q 50/00* | (2012.01) |

(52) U.S. Cl.
CPC ....... *G06Q 10/083* (2013.01); *G06Q 30/0202* (2013.01); *G06Q 30/0241* (2013.01); *G06Q 30/0256* (2013.01); *G06Q 30/0603* (2013.01); *G06Q 30/0621* (2013.01); *G06Q 30/0627* (2013.01); *G06Q 30/0631* (2013.01); *G06Q 30/0641* (2013.01); *G06Q 30/0643* (2013.01); *G06Q 50/04* (2013.01); *G06V 20/20* (2022.01); *G06V 20/80* (2022.01); *G06V 40/20* (2022.01); *H04L 67/535* (2022.05); *G06Q 50/01* (2013.01)

(58) Field of Classification Search
USPC ....................................................... 705/26.5
See application file for complete search history.

(56) References Cited

U.S. PATENT DOCUMENTS

| | | | |
|---|---|---|---|
| 8,219,438 B1 | 7/2012 | Moon et al. | |
| 8,775,230 B2 | 7/2014 | Casas et al. | |
| 8,787,707 B1* | 7/2014 | Steves | G06Q 30/0254 382/321 |
| 8,805,838 B1 | 8/2014 | Khoshnevisan et al. | |
| 9,304,332 B2 | 4/2016 | Fonte et al. | |
| 9,330,407 B2 | 5/2016 | Beaver et al. | |
| 9,454,780 B2* | 9/2016 | Paul | G06Q 10/101 |
| 9,652,797 B2 | 5/2017 | Vijayaraghavan et al. | |
| 9,760,935 B2 | 9/2017 | Aarabi | |
| 10,798,211 B2 | 10/2020 | Yankovich et al. | |
| 11,115,492 B2 | 9/2021 | Yankovich et al. | |
| 2005/0177453 A1 | 8/2005 | Anton et al. | |
| 2008/0004951 A1 | 1/2008 | Huang et al. | |
| 2008/0033939 A1 | 2/2008 | Khandelwal | |
| 2008/0222119 A1* | 9/2008 | Dai | G06F 16/9537 |
| 2009/0259687 A1 | 10/2009 | Do et al. | |
| 2010/0185309 A1 | 7/2010 | Ohiaer et al. | |
| 2011/0184806 A1 | 7/2011 | Chen et al. | |
| 2012/0050529 A1 | 3/2012 | Bentley | |
| 2012/0109777 A1 | 5/2012 | Lipsitz et al. | |
| 2012/0231840 A1 | 9/2012 | Calman et al. | |
| 2013/0190903 A1 | 7/2013 | Balakrishnan et al. | |
| 2014/0052563 A1* | 2/2014 | Watkins | G06Q 30/0621 705/26.5 |
| 2014/0193001 A1 | 7/2014 | Oishi | |
| 2014/0279180 A1* | 9/2014 | Beaver | G06Q 30/0643 705/26.5 |
| 2014/0316995 A1 | 10/2014 | Paul et al. | |
| 2015/0066644 A1 | 3/2015 | Narasimhan et al. | |
| 2015/0101134 A1 | 4/2015 | Manz et al. | |
| 2015/0154322 A1* | 6/2015 | Fonte | G02C 13/005 351/178 |
| 2015/0186970 A1 | 7/2015 | Holman et al. | |
| 2015/0220566 A1* | 8/2015 | Cumming | G06F 16/955 707/711 |
| 2015/0248473 A1 | 9/2015 | Kenedy et al. | |
| 2015/0248719 A1* | 9/2015 | Hansen | G06F 3/0304 705/26.63 |
| 2015/0339757 A1 | 11/2015 | Aarabi | |
| 2016/0051078 A1 | 2/2016 | Jenkins et al. | |
| 2016/0335667 A1 | 11/2016 | Aubrey | |
| 2017/0278135 A1 | 9/2017 | Majumdar et al. | |
| 2017/0337611 A1 | 11/2017 | Hsiao et al. | |
| 2018/0285461 A1 | 10/2018 | Smith et al. | |
| 2019/0073697 A1* | 3/2019 | Varley | G06Q 30/0276 |
| 2019/0251616 A1 | 8/2019 | Yankovich et al. | |
| 2019/0253514 A1 | 8/2019 | Yankovich et al. | |
| 2020/0404072 A1 | 12/2020 | Yankovich et al. | |
| 2021/0368021 A1 | 11/2021 | Yankovich et al. | |

FOREIGN PATENT DOCUMENTS

| | | |
|---|---|---|
| WO | 2017011811 A1 | 1/2017 |
| WO | 2019/160601 A1 | 8/2019 |
| WO | 2019/160602 A1 | 8/2019 |
| WO | 2019/160603 A1 | 8/2019 |

OTHER PUBLICATIONS

Response to Restriction Requirement Filed on Jul. 20, 2020, for U.S. Appl. No. 16/040,351, dated May 19, 2020, 12 pages.
Restriction Requirement Received for U.S. Appl. No. 16/040,351, dated May 19, 2020, 6 pages.
Notice Of Allowance received for U.S. Appl. No. 16/040,391, dated Jun. 18, 2020, 5 pages.
Response to Non-Final Office Action filed on Jun. 4, 2020 for U.S. Appl. No. 16/040,391, dated Mar. 4, 2020, 18 pages.
International Search Report received for PCT Application No. PCT/US2018/065644, dated Feb. 27, 2019, 4 pages.
International Search Report received for PCT Application No. PCT/US2018/065659, dated Mar. 6, 2019, 3 pages.
International Search Report received for PCT Application No. PCT/US2018/065670, dated Mar. 6, 2019, 3 pages.
International Written Opinion received for PCT Application No. PCT/US2018/065644, dated Feb. 27, 2019, 7 pages.
International Written Opinion received for PCT Application No. PCT/US2018/065659, dated Mar. 6, 2019, 6 pages.
International Written Opinion received for PCT Application No. PCT/US2018/065670, dated Mar. 6, 2019, 6 pages.
Response to Restriction Requirement filed on Apr. 14, 2020 for U.S. Appl. No. 16/040,351, dated Feb. 14, 2020, 10 pages.
Restriction Requirement Received for U.S. Appl. No. 16/040,351, dated Feb. 14, 2020, 6 pages.
Non-Final Office Action Received for U.S. Appl. No. 16/040,391, dated Mar. 4, 2020, 10 Pages.
International Preliminary Report on Patentability received for PCT Application No. PCT/US2018/065644, dated Aug. 27, 2020, 9 pages.
International Preliminary Report on Patentability received for PCT Application No. PCT/US2018/065659, dated Aug. 27, 2020, 8 pages.
International Preliminary Report on Patentability received for PCT Application No. PCT/US2018/065670, dated Aug. 27, 2020, 8 pages.
Non Final Office Action Received for U.S. Appl. No. 16/040,351, dated Oct. 14, 2020, 22 Pages.
Final Office Action Received for U.S. Appl. No. 16/040,351, dated Apr. 19, 2021, 30 Pages.
Notice of Allowance Received for U.S. Appl. No. 16/040,351, dated Jul. 8, 2021, 17 Pages.
Graham et al., "Computer Vision for Sports: Current Applications and Research Topics", vol. 159, Apr. 26, 2017, pp. 3-18.
Supplemental Notice of Allowability Received for U.S. Appl. No. 16/040,351, dated Jul. 28, 2021, Jul. 28, 2021, 3 Pages.
U.S. Appl. No. 17/008,196, filed Jul. 28, 2022, "Non-Final Office Action", U.S. Appl. No. 17/008,196, filed Jul. 28, 2022, 12 pages.

* cited by examiner

SYSTEM, METHOD, AND MEDIUM FOR GENERATING PHYSICAL PRODUCT CUSTOMIZATION PARAMETERS BASED ON MULTIPLE DISPARATE SOURCES OF COMPUTING ACTIVITY

PRIORITY APPLICATION

This application claims the benefit of and priority to U.S. Provisional Application No. 62/630,192, filed Feb. 13, 2018, the entire contents of which are incorporated herein by reference.

BACKGROUND

Some product customization services allow users to manually define parameters for customizing products in accordance with interests that are unrelated to the products. For example, an online retailer may enable users to select between preexisting images and/or upload their own images to personalize products purchased through the online retailer. Generally, product customization services only enable users to customize a limited set of products in a limited number of ways. For example, a product customization service may be limited to enabling a user to add a selected graphic to a predetermined surface of a stainless-steel water bottle. Unfortunately, these product customization services are completely reliant on individual users first deciding that they would like a product to be customized and then manually defining how to customize the product via one or more web interfaces.

Therefore, existing product customization services encourage increased human interaction with computing systems. For example, such services typically expose a user interface through which a user is required to search for and identify a product to be customized. Then, even after the product which is to be customized is identified, the user is required to transmit additional data indicating how the product is to be customized. Then, the product customization service may generate a computer-generated rendering of the product as it will look if customized per the user-input received. All too often, the user then decides to iteratively modify the user-input defining how to customize the product. With each modification, however slight it may be, existing product customization services re-generate the renderings which results in an exorbitant amount of computing cycles and also increased network traffic as the renderings are transmitted to a computing device of the user to visually convey the rendering to the user.

Furthermore, some product customization services fail to identify and respond to fluctuating demand for products that incorporate combinations of disparate consumer interests. For example, aggregate demand for products that incorporate a particular topic may spike during a period of time when interest in the particular topic is trending among a user group.

It is with respect to these and other considerations that the disclosure made herein is presented.

SUMMARY

Technologies described herein provide a mechanism for generating physical product customization parameters based on multiple disparate sources of computing activity. These disparate sources of computing activity generally correspond to computing activities that are performed by a user without specific regard to product customization. For example, a first source of computing activity may correspond to the user searching for a product that the user intends to purchase. Moreover, second computing activity may correspond to the user reading and/or posting social media content about a topic of interest. As described herein, these computing activities can be monitored to generate physical product customization parameters without requiring a user to manually define the product or even indicate how to customize the product. Rather, the computing activities that are monitored are performed without specific regard to product customizations. Thus, as opposed to conventional product customization services which would encourage increased human interaction with computers, the techniques described herein facilitate physical product customization parameters to be determined that match a user's interests and a product the user was intending to purchase without requiring the user to perform any additional human interaction with a computing device. In this way, computing efficiencies are improved with respect to a wide variety of computing resources. For example, processing cycles are reduced since the user is not required to manually identify the product to be customized or to indicate how to customize it. Moreover, network traffic is reduced since the number of product renderings that are transmitted to the user's computing device is also reduced.

In one illustrative example, a signal may include search queries that are generated by the user (e.g., while browsing through a product category of an online retailer) to identify an intention of the user to acquire a product from the product category. In such an example, a first signal may include web browsing data that indicates that the user has recently developed an interest in lightning glass (e.g., fulgurites).

A second signal may include the user's purchase history and/or search query data and may indicate that the same user has acquired and/or exhibited an intention to acquire a product from a "cufflink" product category. Then, based on having identified both the interest of the user and the intention of the user to acquire a product from the product category, the enhanced product customization service may determine product customization parameters for customizing a physical characteristic of a typical product within the product category in accordance with the identified interest Such signals can be used to generate data that can cause the manufacture of lightning glass-themed cufflinks. In such an example, the cufflinks can have a particular shape, logo, color, or any other physical property indicating an association with lightning glass. In this way, embodiments of the enhanced product customization service may be deployed to customize products for individual users preemptively (e.g., without the individual user's expressly indicating a specific interest in such customized products).

For example, continuing with the scenario in which the individual user has exhibited both an interest in lightning glass and also an intention to acquire cufflinks or a history of having a threshold number of purchased cufflinks, the enhanced product customization service may determine product customization parameters for customizing a physical characteristic of a typical cufflink to generate a customized set of cufflinks for which the physical characteristic is indicative of the identified interest (e.g., a set of "lightning glass" cufflinks on which an actual specimen of lightning glass is affixed to a cufflink backplate).

In another example, one or more signals can indicate that a user recently took a trip to Iceland. Other signals can indicate that the user has a need for a particular product such as a jacket. Based on such signals, a system can generate data causing a manufacturing facility to produce a jacket with Iceland-themed logos or colors.

In some configurations, individual signals can be used to determine physical properties or characteristics of a product. For instance, a user may search an e-commerce web site for a golf club with a green grip and gold shaft. Based on a single search string or a number of search strings, the system can generate data causing a manufacturing facility to produce a customized product, e.g., a golf club with a green grip and a gold shaft.

The disclosed technologies thus provide benefits over existing product customization services which rely upon individual users to first decide that they would like to customize some physical part of a product (e.g., to be indicative of a particular interest) and then manually define parameters for customizing the product in some predetermined manner (e.g., by having an uploaded graphic printed on the product). For example, the techniques described herein enable an enhanced product customization service to analyze disparate forms of information (e.g., social media data in addition to search query data received from an online retailer) to preemptively determine how to customize various products to suit interests of a user even without the user ever contemplating, let alone requesting, such customization. Thus, a user may be provided with a physically manufactured instance of a customized product (and/or shown a graphical representation of the customized product) that merges interests of the user in ways the user hasn't expressed or even thought of.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
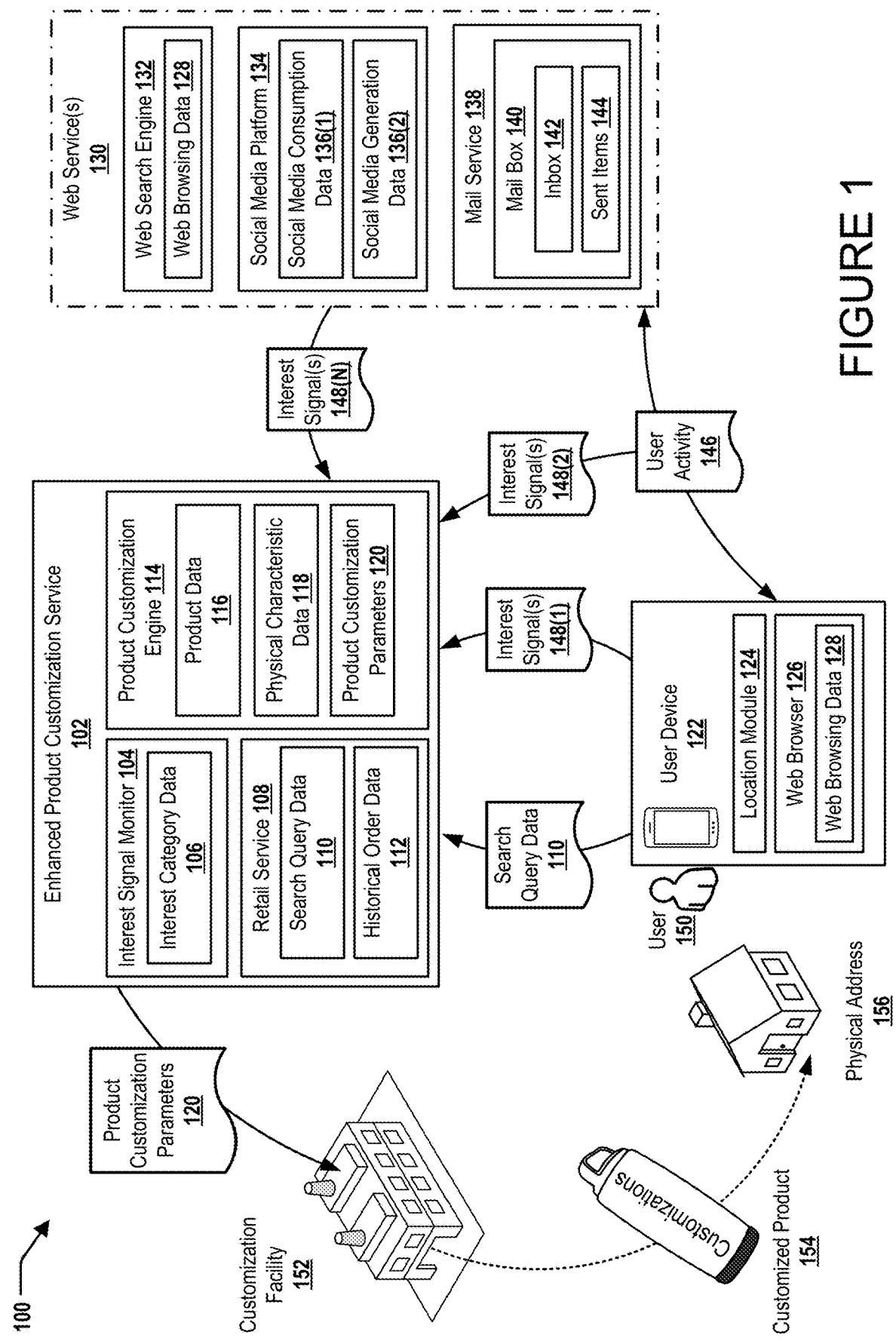
FIG. 1 illustrates an exemplary system for identifying a product that a user intends to acquire and identifying an interest of the user that is unrelated to the product, and then generating product customization parameters for customizing the product in accordance with the interest, without input by the user.

The following Detailed Description describes technologies that enable a computer-implemented enhanced product customization service to automatically generate product customization parameters for customizing a product for a user in accordance with a separately identified interest of the user that is unrelated to the product. In contrast to existing product customization services which encourage human interaction with computing device (e.g., by requiring a user to manually identify a product and define how to customize the product), the technique described herein facilitate product customizations without encouraging increased human interaction with computers. For example, computing activities of the user that are unrelated to product customizations are analyzed to generate physical product customization parameters without requiring any human interaction with computers that specifically relates to defining product customization parameters. Thus, for at least the reason that human interaction with computers is reduced, the techniques described herein effectively reduce both processing cycles and network traffic that result from product customizations.

Generally described, some embodiments analyze signals received from various sources to identify an interest of a user. Embodiments also identify an intention of the user to acquire a specific product and/or a type of product by analyzing search queries that are generated by the user while browsing through a product category that is unrelated to the interest.

Then, based on having identified both a subject of interest of the user and a separate intention of the user to acquire a product from the product category, various embodiments determine product customization parameters for customizing a physical characteristic of the product (which may be under consideration for purchase) in accordance with the separately identified subject of interest of the user. In this way, the enhanced product customization service described herein may be deployed to customize products for individual users without the individual users expressly indicating or even contemplating a specific desire for such customized products. Stated alternatively, the enhanced product customization service may preemptively (e.g., without the individual user expressly indicating a specific interest in such customized products) customize products in accordance with a user's unique interests.

The disclosed techniques are believed to be applicable to a variety of computing scenarios in which first computing activity reveals interest signals that indicate an interest of a user(s) and in which second computing activity reveals an intention(s) of the user(s) to acquire a product. Aspects of the techniques disclosed below are predominantly described in the context of a user's interactions with web services being indicative of an interest of the user (e.g., a subject of interest to the user such as, for example, water skiing and/or fishing) whereas other interactions of the user(s) with a retail service are indicative of an intention of the user(s) to acquire a product. Various aspects of the disclosed techniques are, however, widely applicable to other computing scenarios. For example, in some instances, an intention to acquire a product may be identified by analyzing data that is unrelated to a retail service. For example, a user may generate a social media post that states "Does anyone have a recommendation for a good durable water bottle? and is, therefore, indicative that the user intends to purchase a water bottle. Thus, it can be appreciated that any other computing scenario that is suitable for identifying both interest signals and an intention to acquire a product is within the scope of the present disclosure.

In an exemplary embodiment, the enhanced product customization service may receive interest signals that indicate an association between a user and an interest category. For example, the enhanced product customization service may receive web browsing data that indicates that a user has performed numerous web searches that relate to the interest category. As another example, the enhanced product customization service may receive social media data that indicates that the user has generated and/or consumed social media content that relates to the interest category. In various implementations, interest signals may be received from multiple sources and analyzed to identify associations with interest categories that are commonly exhibited across the multiple sources.

A strength of the user's interest may be determined based on how associations with the interest categories are commonly exhibited across the multiple sources. For example, web browsing data may be analyzed to identify that a user has performed numerous web searches in association with a specific topic (e.g., "How is lightning glass formed?" and "How hot is lightning glass after the lightning strike?" wherein lightning glass is the specific topic) and social media generation data may also be analyzed to identify that the same user has made several social media postings proclaiming an interest in the specific topic (e.g., "Hey friends, here are some cool pictures of lightning glass!"). Under these specific but nonlimiting circumstances, the enhanced product customization service may determine that the user has a strong interest in the specific topic and, therefore, would likely appreciate being provided and/or offered products that are customized in accordance with this interest in the specific topic. As described in more detail herein, exemplary interest signals include, but are not limited to, web browsing activity of a user, social media generation activity of the user, and/or social media consumption activity of the user.

The enhanced product customization service may further receive search query data that indicates an intention of the user to acquire a product. For example, the user may enter one or more search strings into a website or mobile application of an online retailer for the purpose of identifying a product to acquire within a specific product category. The enhanced product customization service may analyze the search query data to identify the intention of the user to acquire a product. In some implementations, the search query data may reveal correlations between product searching behavior (e.g., behavior exhibited by the user while browsing through product categories) and product purchasing behavior exhibited by the user.

As a specific but nonlimiting example, the enhanced product customization service may determine that if a user views six ("6") or more individual products within a specific product category during a two-day window of time, that there is a ninety-five percent ("95%") likelihood that the user intends to purchase a product from that specific product category (e.g., based on an observation that 95% of the time this behavior results in a purchase). Accordingly, under these specific circumstances, if the search query data reveals that the user has viewed twelve ("12") individual sets of cufflinks in the last two days, then the enhanced product customization service may determine that there is at least a 95% chance that the user intends to purchase a set of cufflinks.

Physical characteristics may be determined for one or more typical products from within the specific product category that the user intends to acquire a product from. For example, the enhanced product customization service may analyze images of individual products within the specific product category to determine a shape and/or dimensions that are typical of products within the specific product category. As a specific but nonlimiting example, in the event that it is determined that the user intends to acquire a set of cufflinks, images of numerous different cufflinks may be obtained and analyzed to identify one or more specific physical characteristics of a typical cufflink that is suitable for customization.

Based on the physical characteristics identified for the product, the enhanced product customization service may then determine product customization parameters for customizing the physical characteristics in accordance with the interest category that was previously identified as being associated with the user. In various implementations, the product customization parameters may be determined based on a relative size between the physical characteristics of the "customizable" product and a typical size of a physical specimen corresponding to the interest category. For example, if the typical size of a physical specimen from the interest category is roughly similar in size to the physical characteristics of the "customizable" product, then the product customization parameters may be designed to create a customized product in which the physical characteristics incorporates a physical specimen from the interest category.

As a specific but nonlimiting example, if the user intends to acquire a set of cufflinks and it is determined that a typical ornament attached to a cufflink backplate is roughly the same size as a typical physical specimen of lightning glass, the product customization parameters may be designed to instruct a customization facility (e.g., a manufacturer) to generate a customized product by affixing a specimen of lightning glass to a backplate of a standard cufflink template.

In various implementations, the enhanced product customization service may communicate the product customization parameters to a customization facility along with instructions to generate a customized product based on the "specified" product customization parameters. The customized product may in some implementations be specifically tailored such that the physical characteristics identified for the product are altered to be indicative of the interest category. For example, in an instance in which the physical characteristics include a surface of the product that is suitable for having an image applied thereto, the customization parameters may include instructions to apply an image that is indicative of the interest category that is identified for the user (e.g., a picture of lightning glass or any other suitable interest category) to the surface of the product. Thus, the final and customized product may have a surface that graphically illustrates an image that is related, or is otherwise indicative of, the interest category (e.g., a text phrase associated with the identified interest category may be applied to the surface).

As a specific but nonlimiting example, under circumstances in which a user has exhibited an interest in lightning glass and has further exhibited an intention to acquire a set of cufflinks, the product customization parameters may correspond to customizing a set of cufflinks by affixing a specimen of lightning glass to a backplate of a cufflink. As another specific but nonlimiting example, under circumstances in which the same user (i.e., the user that is interested in lightning glass) exhibits an intention to acquire a stainless steel water bottle, the product customization parameters may alternatively correspond to customizing a water bottle by applying one or more graphics to a suitable surface of the water bottle (e.g., a picture of lightning glass and/or a phrase related to lightning glass such as "I heart lightning glass!").

In some implementations, the enhanced product customization service may schedule a preemptive delivery of the customized product to the user (e.g., at a physical address of the user such as the home and/or office). In this way, the enhanced product customization service enables the user to receive products that are specifically customized to merge unique interests of the user in a preemptive manner even though the user has neither ordered nor even expressed and/or contemplated a desire for the specifically customized product. In various implementations, a notification may be generated to inform the user that a preemptive delivery has been scheduled and to provide the user with the ability to cancel the preemptive delivery (e.g., to avoid being provided with and/or charged for the customized product). Thus, the techniques described herein enable an enhanced product customization service to provide users with a valuable service that requires "zero-effort" from the user while providing the user with customized products that are uniquely tailored to incorporate the user's unique set of interests into products that the user already intends to purchase. Furthermore, this occurs without requiring any human interaction with a computing device to occur that is specifically intended for the user to indicate a product to customize and/or define how the product is to be customized. It can be appreciated, therefore, that for at least the reason that the described techniques reduce human interaction with computers over existing product customization services, the described techniques provide a measurable reduction in both computing cycles and network traffic.

Turning now to FIG. 1, illustrated is an exemplary system 100 for identifying a product that a user intends to acquire and for also identifying an interest of the user that is unrelated to the product. The exemplary system 100 then generates product customization parameters for customizing the product in accordance with the interest. As illustrated, the system 100 may comprise an enhanced product customization service 102 that includes an interest signal monitor 104 for identifying the interest of the user and a product customization engine 114 for generating the product customization parameters 120 based on the identified interest. Ultimately, the enhanced product customization service 102 may communicate aspects of a customized product 154 to the user by, for example, communicating the product customization parameters to a customization facility 152 which may in turn preemptively generate the customized product 154 and deliver it to the user 150.

The interest signal monitor 104 may include interest category data 106 that defines a plurality of different interest categories. As used herein, the term "interest category" may refer generally to any readily identifiable topic and/or category of topics that one or more users may exhibit varying degrees of interest in through interactions with a computing device. Exemplary interest categories include, but are not limited to, general categories that indicate topics of interest such as a genre of music (e.g., "50's Rock-and-Roll," "Modern Pop," etc.), a type of vehicle (e.g., "Muscle Cars," "Off-Road Pickup Trucks," etc.), and/or a type of activity (e.g., "Cooking," "Exercise," etc.). Exemplary interest categories may also include, but are not limited to, specific categories that indicate topics of interest such as a specific musical group and/or artist ("Elvis Presley," "Beyoncé Knowles," etc.), a specific vehicle (e.g., "AMC Javelin," "Ford Raptor," etc.), and/or a specific activity (e.g., "Cake Decorating," "Yoga," etc.). The interest signal monitor 104 may receive interest signals 148 from one or more different sources. As illustrated, the interest signal monitor 104 receives first interest signals 148(1) from a user device 122 that is associated with the user 150, second interest signals 148(2) by monitoring user activity 146 (e.g. user activity data) that is associated with one or more web services 130, and $N^{th}$ interest signals 148(N) that are obtained directly from the one or more web services 130. Although illustrated as a "Smart phone" style computing device, the user device 122 may be any other suitable computing device such as, for example, a desktop computer, a tablet computer, a laptop computer, etc.

With specific reference to the first interest signals 148(1), the interest signal monitor 104 may be configured to communicate directly with the user device 122 to obtain data that can be analyzed to identify one or more interests of the user 150. For example, under various circumstances, a location of the user 150 at a particular time may be indicative of an interest of the user 150 and, therefore, the first interest signals 148(1) may include location data that is generated and/or time stamped by a location module 124 of the user device 122. As a specific but nonlimiting example, the first interest signals 148(1) may include location data indicating that the user 150 is attending a sporting event for a professional sports team such as, for example, the SEATTLE SEAHAWKS. Thus, upon receiving the first interest signals 148(1) from the user device 122, the enhanced product customization service 102 may determine that the user 150 has exhibited at least one of a general interest in a sport (e.g., football and/or professional football) or a specific interest in a particular professional sports team. Additionally, or alternatively, the first interest signals 148(1) may include web browsing data 128 that is generated based on the user 150 deploying with a web browser 126, that is installed on the user device 122, to interact with one or more web services 130.

With specific reference to the second interest signals 148(2), the interest signal monitor 104 may be configured to monitor user activity 146 that corresponds to the user 150 using the user device 122 to request data from and/or transmit data to the one or more web services 130. For example, the interest signal monitor 104 may monitor computing traffic that occurs in one or both directions between the user device 122 and the one or more web services 130. The interest signal monitor 104 may analyze this computing traffic to identify one or more interests of the user 150. In some implementations, the user activity 146 may be in the form of the web browsing data 128 which may be generated based on the user 150 deploying the web browser 126 to interact with a web search engine 132. The interest signal monitor 104 may analyze the web browsing data 128 to identify topics that recur in numerous web search strings that the user 150 enters into the web search engine 132. As a specific but nonlimiting example, the interest signal monitor 104 may observe that the user 150 repeatedly enters web searches that are related to a specific professional sports team and, based thereon, may determine that the user 150 has exhibited an interest in this professional sports team. Exemplary web search engines 132 include, but are not limited to, GOOGLE WEB SEARCH, MICROSOFT BING, and/or any other software system that is designed to facilitate searching for information on the World Wide Web.

In some implementations, the user activity 146 may be in the form of social media consumption data 136(1) that is generated based on the user 150 deploying the web browser 126 and/or a social media application client (not shown) that is installed on the user device 122 to request social media content that has been posted by one or more other users on a social media platform 134. For example, the interest signal monitor 104 may analyze the social media consumption data 136(1) and determine that the user 150 frequently visits a social media page that is related to a particular topic of interest. Additionally, or alternatively, the user activity 146 may be in the form of social media generation data 136(2) that is generated based on the user 150 deploying the web browser 126 to generate and, ultimately, post social media content to the social media platform 134. For example, the interest signal monitor 104 may monitor publicly available social media posts, that are made on an account of the user 150, to identify a particular topic that the user 150 exhibits an interest in. As a more specific but nonlimiting example, the interest signal monitor 104 may analyze a photograph of the user 150 holding a fish along with a caption that states "Check Out Today's Catch!" to determine that the user 150 is interested in fishing.

In some implementations, the interest signal monitor 104 may perform image analysis on one or more images posted by the user 150 on the social media platform 134 and determine an interest of the user based on the image analysis. As a more specific but nonlimiting example, the interest signal monitor 104 may analyze numerous images posted by the user 150 and determine that in each post where a fish is shown the type of fish is steelhead trout. Thus, based on performing the image analysis of the images posted by the user 150, the interest signal monitor 104 may determine both a general interest category (e.g., outdoor sporting) as well as a specific interest category (e.g., fishing for steelhead trout). Exemplary social media platforms 134 include, but are not limited to, FACEBOOK, INSTAGRAM, PINTEREST, TWITTER, and/or any other computer mediated technology that facilitates the creation and sharing of information that may be indicative of an interest of the user 150.

With specific reference to the $N^{th}$ interest signals 148(N), the interest signal monitor 104 may be configured to communicate directly with the one or more web services 130 to identify and/or receive the $N^{th}$ interest signals 148(N) corresponding to the user 150. For example, the user 150 may provide the interest signal monitor 104 with user credentials corresponding to one or more of the web search engine 132, the social media platform 134, and/or a mail service 138 to enable the interest signal monitor 104 to automatically log into one or more user accounts to harvest information associated with the user 150. In some implementations, the interest signal monitor 104 may use credentials provided by the user 150 to log into the web search engine 132 to retrieve the web browsing data 128 and/or to log into the social media platform 134 to retrieve the social media consumption data 136(1) and/or the social media generation data 136(2) (collectively referred to herein as social media data 136).

In some implementations, the interest signal monitor 104 may use credentials provided by the user 150 to log in to a mailbox 140 of the user 150 that is facilitated by a mail service 138. Then, the interest signal monitor 104 may access an inbox 142 to analyze individual mail items that are sent to the user 150 and are indicative of one or more topics that are of interest to the user 150. For example, the interest signal monitor 104 may access the inbox 142 and discover a plurality of purchase receipts and/or order confirmation emails that are commonly associated with a particular topic and, based thereon, determine that the user 150 is interested in this particular topic. As a specific but nonlimiting example, the interest signal monitor 104 may analyze the inbox 142 and identify that the user 150 is interested in fishing based on an order confirmation for a fishing magazine subscription and a plurality of receipts for various fishing gear items. Additionally, or alternatively, the interest signal monitor 104 may access sent items 144 stored in the mailbox 140 to analyze individual mail items that are sent by the user 150 and are indicative of one or more topics that are of interest to the user 150. For example, the interest signal monitor 104 may access the sent items 144 and discover a series of emails that have been sent by the user 150 for the purpose of organizing an annual fishing trip with a group of friends and, based thereon, determine that the user 150 is interested in fishing. Exemplary mail services 138 include, but are not limited to, GOOGLE GMAIL, MICROSOFT OUTLOOK, and/or any other service that facilitates exchanging messages between two or more electronic devices.

The enhanced product customization service 102 may receive (or otherwise become apprised of) search query data 110 that indicates an intention of the user 150 to acquire a product. For example, the user 150 may enter one or more search strings into a website or mobile application of retail service 108 to identify a product to acquire within a specific product category. In the illustrated example, the retail service 108 is shown as an integral component of the enhanced product customization service 102. However, in various implementations, the search query data 110 may be transmitted from the user device 122 to a retail service that is separate from the enhanced product customization service 102. For example, in a scenario in which the retail service 108 is included within the web services 130, the enhanced product customization service 102 may receive the search query data 110 by monitoring the user activity 146 that is passed between the user device 122 in the web services 130.

The enhanced product customization service 102 may analyze the search query data 110 to identify the intention of the user to acquire a product from a product category. In some implementations, the search query data 110 may reveal correlations between product searching behavior (e.g., behavior exhibited by the user while browsing through product categories) and product purchasing behavior exhibited by the user 150 as indicated within historical order data 112. For example, the enhanced product customization service 102 may analyze the search query data 110 (which may include both current search queries as well as historical search queries) with respect to the historical order data 112 to determine that roughly ninety-five percent ("95%") of the times in which the user 150 has viewed six ("6") or more products within a specific product category during a two-day window of time, the user 150 has shortly thereafter purchased a product from that specific category. Thus, under these specific circumstances, the enhanced product customization service 102 may observe from the search query data 110 that the user 150 has viewed six or more individual water bottles within a "water bottle" product category and based on this observation determine that there is a ninety-five percent ("95%") chance that the user 150 intends to purchase a water bottle in the near future.

In some implementations, the enhanced product customization service 102 may analyze pricing information associated with specific products and/or categories of products from the search query data 110 and weigh (e.g., evaluate) the pricing information in determining whether the user 150 intends to acquire a product from a particular product category. For example, an analysis of historical search queries generated by the user 150 with respect to historical orders placed by the user 150 may reveal that roughly ninety-five percent of the times in which the user 150 has viewed six ("6") or more products that are less than twenty-five dollars ("$25 USD") within a specific product category during a two-day window of time the user has shortly thereafter purchased a product for less than twenty-five dollars from the specific product category. Continuing with this example, the same analysis of the historical search queries with respect to the historical orders may further reveal that for products that are greater than one thousand dollars ("$1,000 USD") there is practically no correlation between the number of times the user 150 views products within a specific product category and whether the user 150 makes a purchase from within the specific product category. As a specific but nonlimiting example, under circumstances in which the user 150 views ten different water bottles that are less than $25 and also views ten different performance speed boats that are greater than $50,000 within the same two-day window of time, the enhanced product customization service 102 may make a determination that the user 150 intends to purchase a water bottle in the near future but may refrain from making any determination as to whether the user 150 intends to purchase a performance speedboat.

In some implementations, upon determining that the user 150 intends to acquire a product from a product category, the enhanced product customization service 102 may deploy a product customization engine 114 to determine physical characteristics that correspond to one or more products within the product category.

Under circumstances where the search query data 110 reveals that the user 150 intends to acquire a specific product from within the product category, the product customization engine 114 may determine physical characteristics that correspond to the specific product. As a specific but nonlimiting example, the search query data 110 may reveal that the user 150 intends to purchase a twenty-six-ounce sized YETI RAMBLER insulated water bottle. In this example, the product customization engine 114 may access product data 116 to find specific product data for this twenty-six-ounce sized YETI RAMBLER insulated water bottle. Ultimately, the product customization engine 114 may analyze the specific product data to generate physical characteristic data 118 that indicates one or more physical characteristics of the specific product that the user 150 intends to acquire.

Under circumstances where the search query data 110 reveals that the user 150 intends to acquire a product from within a product category but does not indicate any specific product from within the product category, the product customization engine 114 may determine physical characteristics that correspond to one or more typical products from within the product category. As a specific but nonlimiting example, the search query data 110 may reveal that the user 150 intends to purchase a water bottle that is less than $25 and holds between twenty and twenty-six ounces of fluid. In this example, the product customization engine 114 may access product data 116 to identify a variety of products that satisfy these criteria and then analyze this product data 116 to generate physical characteristic data 118 that indicates one or more physical characteristics of products which satisfy these criteria.

Under circumstances where the search query data 110 reveals that the user 150 intends to acquire a product that meets certain product criteria but does not indicate any specific product from within the product category, the product customization engine 114 may alternatively select a specific product that meets product criteria revealed from the search query data 110. Continuing with the previous example where the search query data 110 revealed that the user 150 intended to purchase a water bottle that is less than $25 and holds between twenty and twenty-six ounces of fluid, the enhanced product customization service 102 may analyze the product data 110 to select a specific product that meets these criteria. The specific product may be selected based on various factors such as, for example, a user rating of the specific product (e.g., four out of five stars), product popularity (e.g., a sales volume of the product and/or trending sales of the product), and availability of the product (e.g., whether the product can ship immediately), a price, a warranty, or any other factor suitable for selecting the product. Upon selecting the specific product that meets the product criteria, the product customization engine 114 may determine one or more physical characteristics that correspond to the specific product that has been selected for the user 150.

Based on the physical characteristic data 118 generated for the product, the enhanced product customization service 102 may determine product customization parameters 120 for customizing the physical characteristics determined for the product. More specifically, the product customization parameters 120 may indicate how to customize the physical characteristics of the product in accordance with the interest category identified as being associated with the user 150. As a specific but nonlimiting example, the interest signals 148 may indicate that the user 150 is interested in fishing and the search query data 110 may indicate that the user 150 intends to acquire a specific water bottle. In this example, the product customization engine 114 may analyze product data 116 associated with the specific water bottle to identify a surface of the water bottle that is substantially large and smooth enough to have graphics printed thereon (e.g., through a silkscreen manufacturing process and/or any other suitable process). In this example, the product customization engine 114 may further select and/or generate one or more graphics that are indicative of the user's interest in fishing (e.g., a graphic of a steelhead trout and and/or a text phrase caption related to fishing). Upon determining the product customization parameters 120 for customizing the physical characteristics that have been determined for the product which the user 150 intends to acquire, the enhanced product customization service 102 may communicate aspects of these product customization parameters 120 to the user 150.

In some implementations, the enhanced product customization service 102 may transmit the product customization parameters 120 to a customization facility 152 to initiate a physical customization process for generating a customized product 154. In the illustrated example, the customized product 154 is shown to be a water bottle that has been customized so that an outer surface of the water bottle includes some indicia that is indicative of the interest identified for the user 150. As a specific but nonlimiting example, the customization parameters 120 may include a graphic that relates to fishing (e.g., a picture of a fish) and an instruction to apply the graphic onto the outer surface of the water bottle.

In some implementations, the enhanced product customization facility 102 may be configured to identify one or more customization facilities that offer customization services for one or more specific products and/or general categories of products. For example, the enhanced product customization service 102 may automatically "crawl" through one or more web sites that are accessible and/or categorized/ranked by the web search engine 132 to identify a customization service that is offered to consumers. As a specific but non-limiting example, a water bottle company may provide consumers with the ability to upload photographs and, ultimately, have these photographs printed onto a water bottle for the consumers. In this example, the enhanced product customization service 102 may identify and bookmark the customization service. Then, upon determining that the user 150 intends to purchase a product and/or type of product that is offered by the customization service, the enhanced product customization service 102 may communicate the product customization parameters 120 through the customization service which in turn passes the product customization parameters 120 to the customization facility 152. Upon completing the physical customization process, the customized product 154 may be delivered to the user 150. In the illustrated example, the customized product 154 is delivered directly from the customization facility 152 to a physical address 156 of the user 150, e.g., a home and/or office of the user 150.

In some implementations, the enhanced product customization service 102 may preemptively deliver the customized product 154 to the user 150. In this way, the enhanced product customization service 102 enables the user 150 to receive products that are specifically customized to merge unique interests of the user 150 in a preemptive manner even though the user 150 has neither ordered nor even expressed and/or contemplated a desire for the customized product 154. Thus, the disclosed techniques provide the user 150 with a product customization service that requires "zero-effort" from the user 150 while still providing the user 150 with products which the user 150 intends to soon purchase and which are transformed into customized products 154 that are uniquely tailored to be indicative of various unique interests of the user 150.

Figure 2:
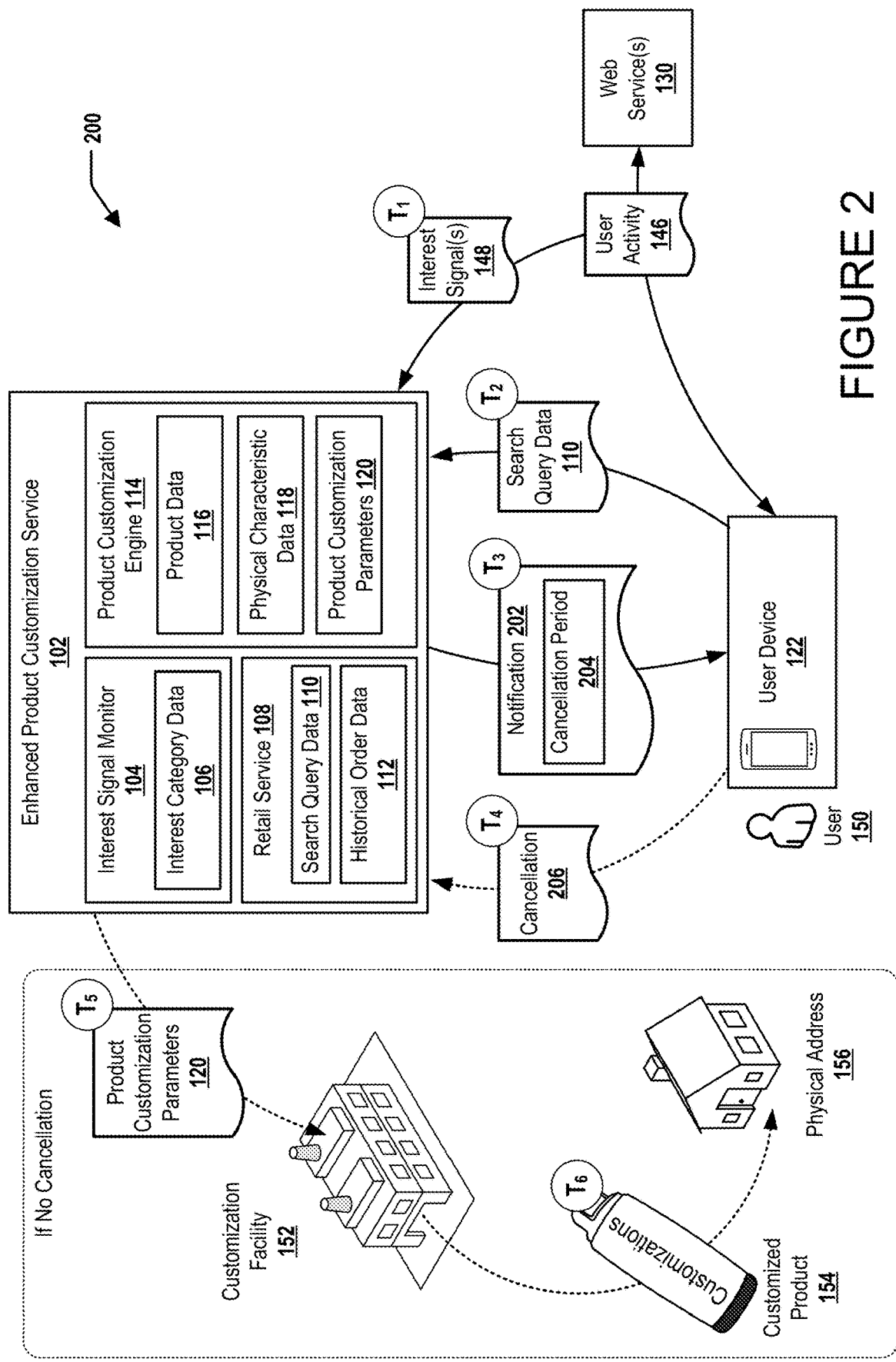
FIG. 2 illustrates an exemplary system that generates customization parameters for generating a customized product and then communicates aspects of the customized product to a user in a notification.

Turning now to FIG. 2, illustrated is an exemplary system 200 that generates product customization parameters 120 for generating a customized product 154 and then communicates aspects of the customized product 154 to the user 150 in a notification 202. To illustrate aspects of the techniques disclosed herein, FIG. 2 illustrates an exemplary data flow scenario in which various operations and/or functionalities occur in a specific order. More specifically, FIG. 2 describes various operations and/or functionalities occurring at six sequential times that are individually labeled $T_1$ through $T_6$. However, the order in which these operations and/or functionalities are described and/or illustrated herein is not intended to be construed as a limitation. Rather, any number of the operations and/or functionalities described with respect to FIG. 2 may be combined in any order and/or in parallel in accordance with the present disclosure. Other processes and/or operations and/or functionalities described throughout this disclosure shall be interpreted accordingly.

At time $T_1$, the interest signal monitor 104 may receive interest signals 148 from one or more sources. As illustrated, the interest signals are received from monitoring the user activity 146 that is generated when the user 150 operates the user device 122 to request data from and/or transmit data to the one or more web services 130. Specifically, the interest signal monitor 104 is shown to monitor computing traffic that occurs between the user device 122 and the web services 130. The interest signal monitor 104 then analyzes this computing traffic to identify one or more interests of the user 150.

At time $T_2$, the enhanced product customization service 102 receives search query data 110 indicating the intention of the user 150 to acquire a product. For example, the user 150 may enter searches into a website retail service 108 to browse a particular product category. The enhanced product customization service 102 may analyze the search query data 110 to identify the intention of the user to acquire a product from the particular product category. For purposes of the discussion of FIG. 2, assume that the search query data 110 indicates that the user intends to purchase a water bottle in the near future. Thus, the enhanced product customization service 102 identifies physical characteristics of a water bottle that meets certain criteria for the user 150 and then, based thereon, determines product customization parameters 120 for customizing the physical characteristics to generate the customized product 154.

At time $T_3$, the enhanced product customization service 102 generates and transmits a notification 202 to the user device 122 to communicate aspects of the customized product 154 to the user 150. In some implementations, the notification 202 may include an indication of a preemptive delivery that has either been scheduled or will be scheduled without contrary instructions being received from the user 150. Thus, if no action is taken by the user 150 in response to receiving the notification 202, the customized product 154 may be generated and delivered to the user 150 even without the user 150 generating an order for the customized product 154.

In some implementations, the notification 202 may indicate a cancellation period 204 that defines a period of time during which the user 150 is able to prevent the customized product 154 from being manufactured and/or delivered to the user 150. For example, the notification 202 may come as a pop-up notification that includes a graphical representation of the customized product (e.g., either a computer rendering or actual photograph of the customized product 154) and a text string indicating the cancellation period (e.g., one hour, one day, one week, etc.) and/or a user interface element (e.g., a button) that enables the user 150 to generate cancellation data to prevent the preemptive delivery. As a specific but nonlimiting example, the notification 202 may include a cancellation button and a statement such as: "Here's a customized water bottle designed just for you. We think you'd like this and plan to make it next week and send it to you. If you don't want this, just click this cancel button before Monday January 29$^{th}$ and we won't make or send it."

In some implementations, at time $T_4$, a cancellation 206 is sent from the user device 122 to the enhanced product customization service 102 in response to the user 150 generating the selection data to prevent the preemptive delivery. For example, in a scenario where the notification 202 includes a cancel user interface element (UIE) that enables the user 150 to generate a cancellation request (e.g., a cancel button), the user 150 may simply select the cancel UIE to send the cancellation 206. In response to receiving the cancellation 206, the enhanced product customization service 102 may cancel the preemptive delivery of the customized product 154 to the physical address 156 of the user 150. In some instances, canceling the preemptive delivery may include refraining from sending the product customization parameters 120 to the customization facility 152.

Thus, under circumstances in which the cancellation 206 is received during the cancellation period 204, the exemplary data flow scenario of FIG. 2 may terminate immediately rather than proceeding to the operations/functionalities described as occurring at $T_5$ and/or $T_6$. Under contrasting circumstances in which the cancellation 206 is not sent during the cancellation period 204, the exemplary data flow scenario of FIG. 2 may proceed to the operations/functionalities described as occurring at $T_5$ and/or $T_6$.

At time $T_5$, the enhanced product customization service 102 may transmit the product customization parameters 120 to the customization facility 152 to initiate a physical customization process for generating the customized product 154.

At time $T_6$, the physical customization process has been completed and the customization facility 152 causes the customized product 154 to be delivered to the user 150. In the illustrated example, the customized product 154 is delivered directly from the customization facility 152 to a physical address 156 of the user 150.

The techniques disclosed in relation to FIG. 2 provide benefits over existing product customization services for at least the reason that the user 150 may be provided with a customized product 154 that is designed specifically according to the user's interests without requiring the user 150 to exert any effort whatsoever. For example, upon being notified of the aspects of the customized product 154 (e.g., being shown a rendering of the product in the notification 202), it requires "zero-effort" on the part of the user 150 to obtain the customized product 154. All the while, however, the user 150 retains control over whether the customized product 154 is made. That is, if the user 150 takes no action responsive to the notification 202 then the customized product 154 is delivered (e.g., "zero-effort" product acquisition), whereas if the user 150 simply clicks the cancel UIE within the notification 202 the delivery can be averted.

Figure 3:
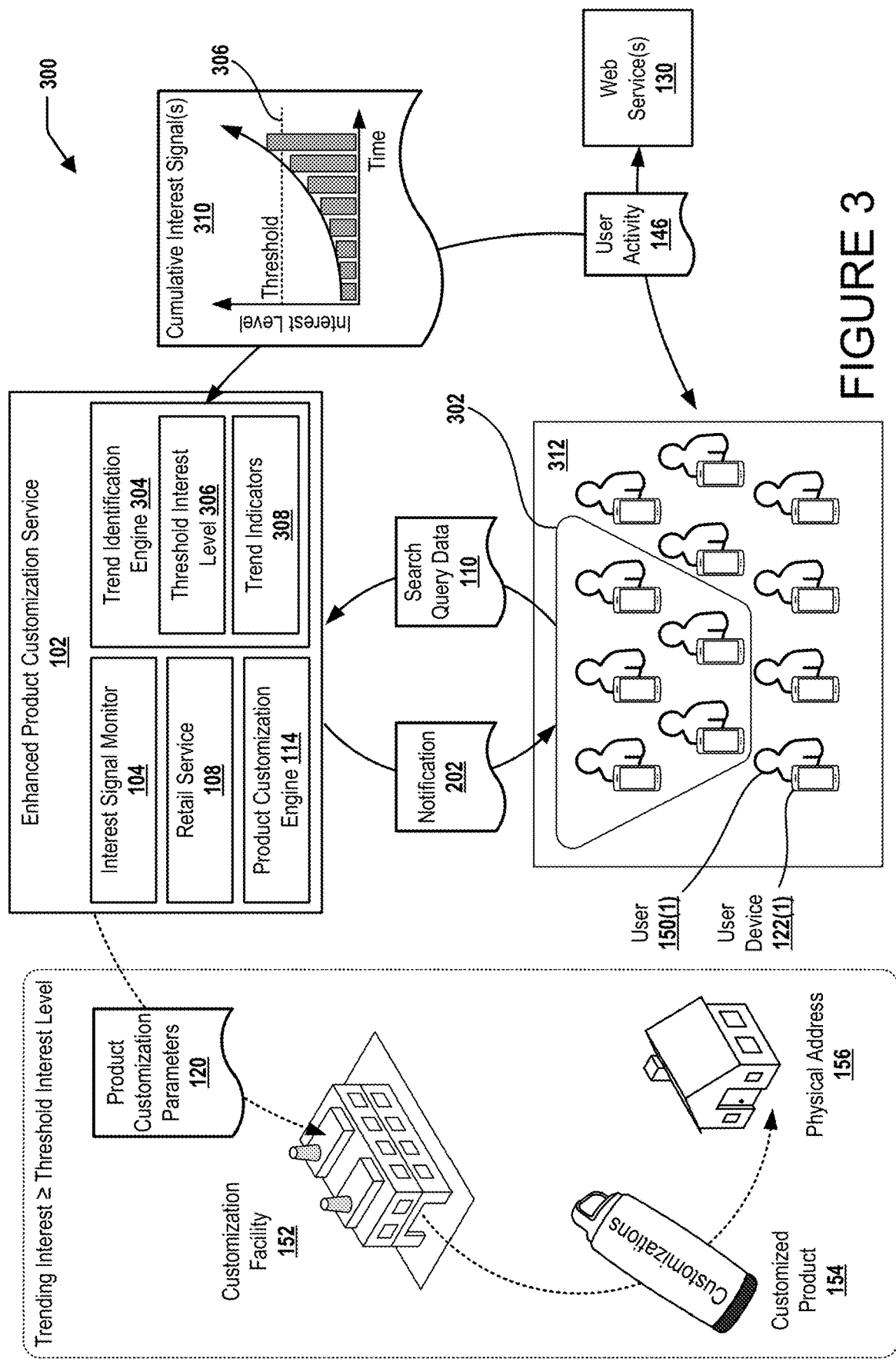
FIG. 3 illustrates an exemplary system for preemptively customizing products in accordance with interests that are trending within a group of users.

Turning now to FIG. 3, illustrated is an exemplary system 300 for preemptively customizing products in accordance with interests that are trending within a group of users 302. As illustrated, the enhanced product customization service 102 may include a trend identification engine 304 for detecting cumulative interest signals 310 that indicate a trending interest, within the group of users 302, for a particular interest category. As used herein, the term "cumulative interest signals" may refer generally to interest signals that are increasing and/or growing for a particular interest category. For example, under circumstances in which the user activity 146 is monitored with respect to a sample set of users 312 that includes the group of users 302, the trend identification engine 304 may identify multiple instances where individual users generate user activity 146 (e.g., web browsing data 128, social media data 136, etc.) that is indicative of an interest in a particular topic.

These multiple instances may form cumulative interest signals 310 that are generally indicative of an interest level of the sample set of users 312 and/or the group of users 302 in a particular interest category. As a specific but nonlimiting example, the trend identification engine 304 may monitor the user activity 146 for the sample set of users 312 and observe that the group of users 302 have begun exhibiting an interest in the particular interest category, (e.g. by generating and/or consuming social media content that relates to the particular interest category).

In this example, the enhanced product customization service 102 may also receive search query data 110 that indicates that at least some people from the group of users 302 intend to acquire one or more products from a product category. For example, it may be determined that some of the users that are interested in the particular topic have exhibited product searching behavior that is consistent with an intention to purchase a specific water bottle. As described above, the product customization engine 114 may also determine physical characteristics associated with the one or more products and, ultimately, product customization parameters 120 for generating a customized product 154 for which the physical characteristics have been customized to be indicative of the interest that the group of users 302 has shown.

In some implementations, the trend identification engine 304 may monitor the cumulative interest signals 310 to determine whether an interest level for the trending interest reaches a threshold interest level 306. As graphically illustrated within the cumulative interest signals 310 element, the interest level for the trending interest exceeds the threshold interest level 306 at the last observation (e.g., wherein each observation is illustrated as an individual bar graph element). Responsive to the trending interest reaching the threshold interest level 306, the enhanced product customization service 102 may perform a predetermined action to communicate aspects of the customized product 154 to at least some of the group of users 302. For example, each individual user within the group of users 302 may be sent a notification 202 as described above. Additionally, or alternatively, each individual user within the group of users 302 may be sent an instance of the customized product 154 (e.g., the customized product 154 may be sent to a physical address 156 for one or more users in the group of users 302).

In some implementations, detecting the cumulative interest signals 310 may include detecting increasing network traffic associated with the interest category. The increasing network traffic may include an increasing amount of web browsing activity that corresponds to the interest category. For example, if a topic is "trending" or beginning to go "viral," then the group of users 302 that is searching for the topic through the web search engine 132 may be growing (e.g., the group 302 may double in size each day for a week). In some implementations, the threshold interest level 306 may define a threshold number of users such that the predetermined action may be taken responsive to the group of users 302 growing beyond the threshold number of users. As a specific but nonlimiting example, the customized product 154 may be generated and preemptively delivered to a group of users in response to the number of users that exhibit an interest in the interest category exceeding one-thousand. Additionally, or alternatively, the increasing network traffic may include an increasing amount of social media generation activity corresponding to the interest category. For example, if a topic is "trending" or beginning to go "viral," then the group of users 302 that have generated or is actively generating social media content that relates to the topic (e.g., by uploading content to the social media platform 134) may be growing larger. As another example, the group of users 302 that have consumed or is actively consuming social media content that relates to the topic (e.g., by downloading content from the social media platform 134) growing larger may be a trend indicator 308 that the topic is "trending" and/or beginning to go "viral."

In some implementations, the cumulative interest signal 310 may include historical order data that indicates an increasing frequency of orders for products that are associated with the interest category. A trend indicator 308 that a particular interest category is actively trending may correspond to an increasing frequency of disparate products that are commonly related to the particular interest category being purchased by the group of users 302. As a specific but nonlimiting example, the trend identification engine 304 may observe an increasing frequency with which disparate products (e.g., blankets, bumper stickers, and beverage koozies) which all commonly relate to a specific professional sports team are being purchased and may interpret this observation as an indication that the specific professional sports team is a trending interest category. In this way, the enhanced product customization engine 102 may identify a group of users 302 that are exhibiting a trending interest in, for example, the SEATTLE SEAHAWKS based on individual users within the group purchasing disparate types of items which are SEATTLE SEAHAWKS related. Then, the enhanced product customization engine 102 may further observe that at least some of the group of users 302 has also exhibited an intention to purchase a water bottle. Based on the combination of these observations, the enhanced product customization service 102 may determine the product customization parameters and, ultimately, cause a preemptive delivery of the customized product 154.

It can be appreciated that the cumulative interest signals that indicate the trending interest may be comprised of web browsing data that indicates what users have been searching for online and/or historical order data that indicates what users have purchased in the past and/or in the recent past (e.g., within the last one week, one day, or any other suitable recency threshold). It can further be appreciated that the search query data 110 may relate to users searching for one or more products that might be acquired in the future. Accordingly, in various implementations, the cumulative interest signals that indicate the trending interest are discrete from the search query data. Stated alternatively, the search query data 110 is generated based on first user manipulations of the user device(s) 122 while the cumulative interest signals are generated based on second user manipulations of the user device(s) 122, and the first and second user manipulations may occur at different times and/or through different user interfaces (e.g., through different applications, or through different web pages, etc.).

Figure 4:
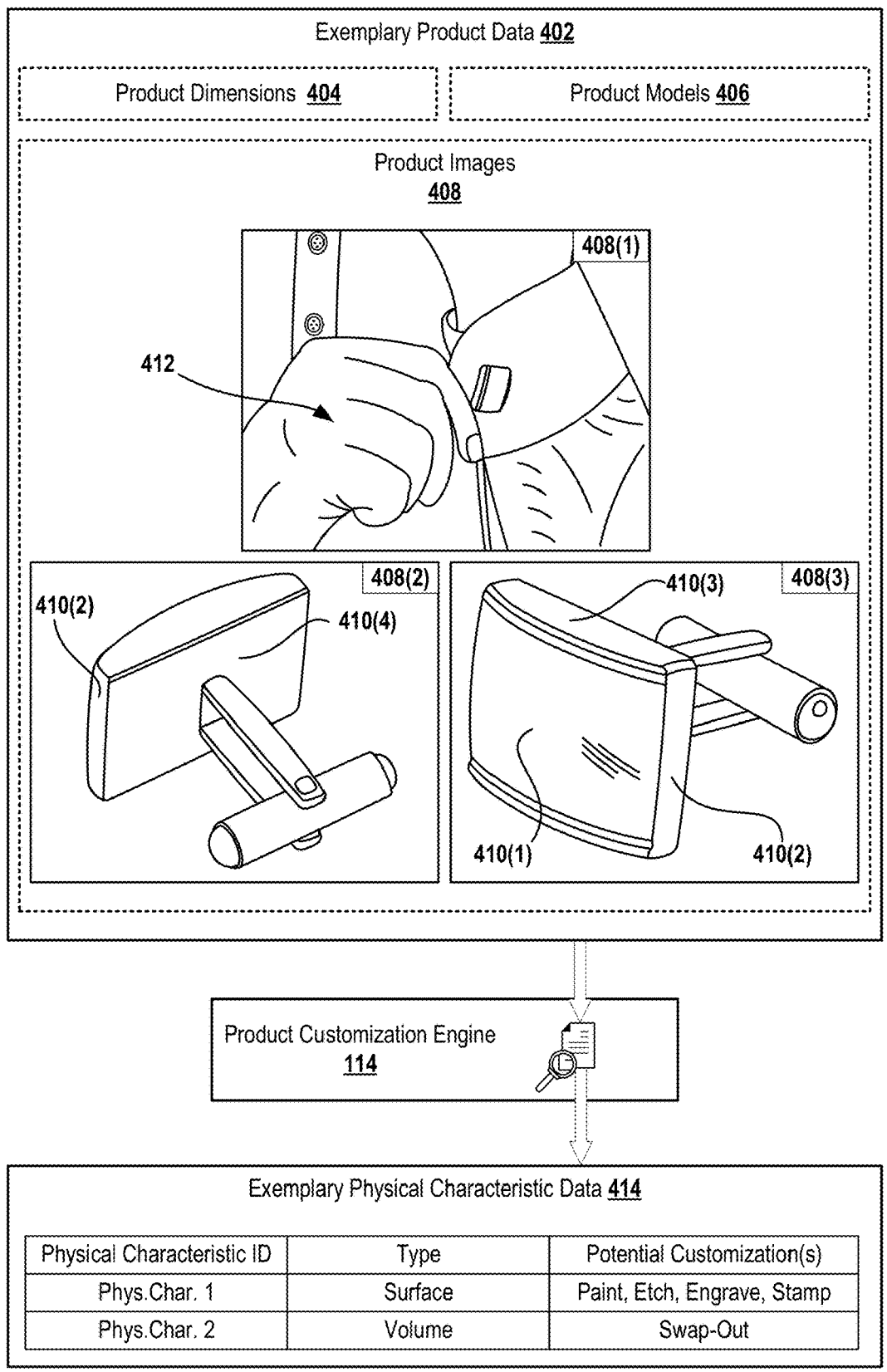
FIG. 4 illustrates exemplary product data that is suitable for analysis by the product customization engine to determine exemplary physical characteristic data.

Turning now to FIG. 4, illustrated is exemplary product data 402 that is suitable for analysis by the product customization engine 114 to determine exemplary physical characteristic data 414. As illustrated, the exemplary product data 402 may include one or more of product dimensions 404 that indicate measurements of length, breadth, depth, and/or height of one or more components of the physical product, product models 406 that define model data such as, for example computer-aided design models for one or more physical products and/or components thereof, or product images 408 that are graphical representations of the physical product. As further illustrated, the exemplary product data 402 may be received and, ultimately, analyzed by the product customization engine 114 to identify one or more specific physical characteristics of the product.

In the illustrated example, the physical product is a cufflink and the product images 408 include one or more different images of the cufflink. More specifically, the product images 408 include a first image 408(1) of the cufflink being worn, a second image 408(2) showing a rear-perspective view of the cufflink so that the post and toggle of the cufflink are prominently visible, and a third image 408(3) showing a front-perspective view of the cufflink so that the portion of the cufflink that is exposed during normal use is prominently visible.

In some implementations, the product customization engine 114 may perform image analysis techniques to analyze the product images 408 for determining one or more physical characteristics of the product such as, for example, the particular surface 410 of the product and/or a volume of the product that is defined by one or more particular surfaces. For example, the product customization engine 114 may analyze the third image 408(3) to identify a first surface 410(1), a second surface 410(2), and a third surface 410(3). The product customization engine 414 may further analyze the second image 408(2) to identify the second surface 410(2) as well as a fourth surface 410(4). In some implementations, the product customization engine 414 may analyze one or more product images 408 with respect to one or more other product images 408 to determine a relative positioning between one or more of the surfaces 410 that have been identified. As a specific but nonlimiting example, the product customization engine 414 may analyze the third image 408(3) with respect to the second image 408(2) to determine that the first surface 410(1) that is identified within the third image 408(3) is opposite the fourth surface 408(4) that is identified in the second image 408(2).

In some implementations, the product customization engine 414 may determine dimensions for one or more of the physical characteristics that are identified for the product. For example, upon identifying the one or more physical characteristics, the product customization engine 414 may analyze the product dimensions 404 against the one or more identified physical characteristics to determine (e.g., via interpolation) additional product dimensions that specifically correspond to the identified physical characteristics.

In some implementations, the product customization engine 114 may determine dimensions for the one or more physical characteristics that are identified by the product by identifying one or more reference objects 412 within one or more of the product images 408. In the illustrated example, the first product image 408(1) is an image of the cufflink being worn by a person and a hand of the person is shown within the first product image 408(1) and, therefore, can be used as a reference object 412. For example, by presuming that the hand of the user is an average size male hand, the product customization engine 114 may assign dimensions to the hand of the user within the first product image 408(1). Then, once dimensions have been assigned to the hand, the product customization engine 114 may further analyze the image to determine a relative size between the product (e.g., the cufflink in the present example) and the reference object 412 (e.g., the average size male hand in the present example). In this way, even if product dimension data 404 is lacking from the exemplary product data 402, the product customization engine 114 may still determine and/or at least estimate dimensions for one or more physical characteristics that are identified for the product.

Upon analyzing the exemplary product data 402, the product customization engine 114 may generate exemplary physical characteristic data 414. In the illustrated example, the product customization engine 114 has identified two discrete physical characteristics wherein a first physical characteristic is assigned to the identifier "Phys.Char. 1" and the second physical characteristic is assigned to the identifier "Phys.Char. 2." As further illustrated, the first physical characteristic is a surface that is suitable for customization in a variety of ways that include, but may not be limited to, painting, etching, engraving, and/or stamping. Furthermore, the second physical characteristic is a volume that is suitable for customization by at least swapping out the volume. For example, the identified volume that currently exists on the product as illustrated in FIG. 4 may be customized by replacing that volume with some other physical volume that is suitable to serve the same and/or a similar purpose to the current volume. In some implementations, the product customization engine 114 may define the identified volume(s) in terms of being bound by one or more identified surfaces 410. With specific reference to the illustrated example, the product customization engine 114 may define the second physical characteristic as being a volume that is bound by the first surface 410(1), the second surface 410(2), the third surface 410(3), and the fourth surface 410(4).

Figure 5:
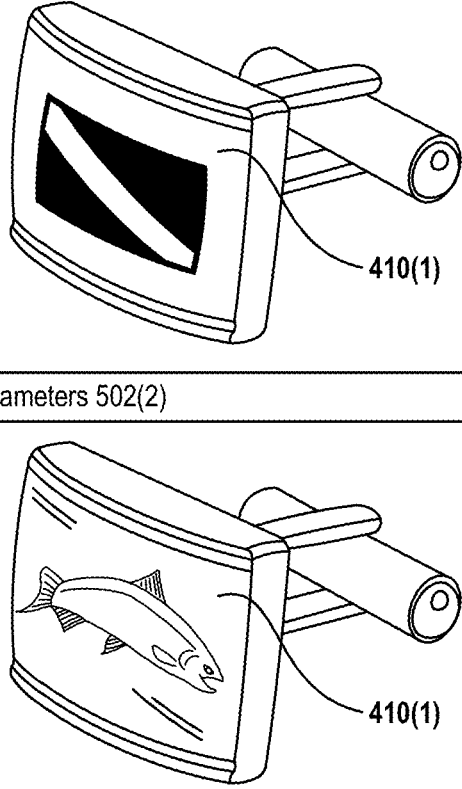
FIG. 5 illustrates exemplary product customization parameters that can be generated based on the exemplary physical characteristic data of FIG. 4.

Turning now to FIG. 5, illustrated are exemplary product customization parameters 502 that can be generated based on the exemplary physical characteristic data 414 of FIG. 4. The exemplary product customization parameters 502 may identify a specific physical characteristic of a product that is to be customized by the customization facility 152.

In the illustrated example, the exemplary product customization parameters 502 include first parameters 502(1) for customizing a product in accordance with an interest category that has been identified for a first user. More specifically, in the illustrated example, the enhanced product customization service 102 has identified that the first user has exhibited an interest in a "SCUBA" interest category and has further identified that the first user intends to purchase a set of cufflinks in the near future. Accordingly, the enhanced product customization service 102 has identified a base set of cufflinks that are suitable for customization and has determined parameters for customizing the base set of cufflinks for the first user by modifying the first surface 410(1) to be indicative of the "SCUBA" interest category. Thus, the first parameters 502(1) may be transmitted to the customization facility 152 with instructions to paint an image of a SCUBA flag as defined by a customization file (e.g. "Scuba.jpg") onto the first surface 410(1).

As further illustrated, the exemplary product customization parameters 502 further include second parameters 502(2) for customizing the same product in accordance with a different interest category that has been identified for a second user. More specifically, in the illustrated example, the enhanced product customization service 102 has also identified that the second user has exhibited an interest in a "Steelhead Trout" interest category and also intends to purchase a set of cufflinks in the near future. Accordingly, the second parameters 502(2) are similar to the first parameters 502(1) except rather than painting the first surface 410(1) based on the "Scuba.jpg" file the base set of cufflinks are customized by laser etching the first surface 410(1) based on a "Fish.dxf" file. It can be appreciated that ".dxf" represents a vector file format that is commonly deployed for laser cutting and/or etching operations using computer-controlled machinery.

Thus, it can be appreciated from the exemplary product customization parameters 502 that under circumstances in which multiple users have exhibited an intention to purchase a product from the same product category, the enhanced product customization service 102 can preemptively determine customization parameters 502 for customizing such products based on the varying interests of the multiple users.

Figure 6:
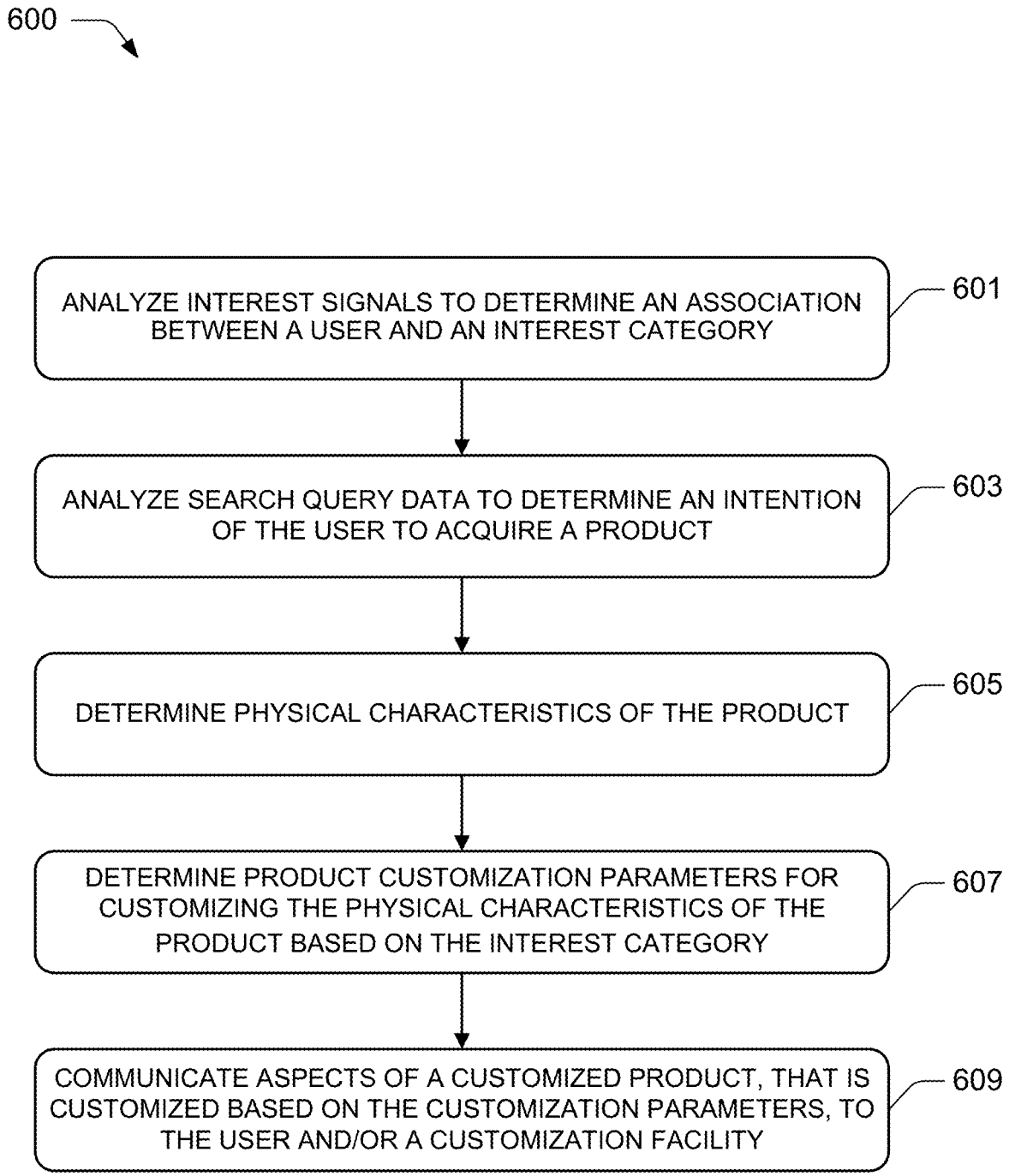
FIG. 6 is a flow diagram of an example process of preemptively determining product customization parameters for customizing a product for a user in accordance with an interest of the user.

FIG. 6 illustrates a flow diagram in association with an example process 600 which is described with reference to FIGS. 1-5. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 6, a flow diagram illustrates an example process 600 of preemptively determining product customization parameters for customizing a product for a user in accordance with an interest of the user.

At block 601, a system may analyze interest signals that are received from one or more sources to determine an association between a user and an interest category. For example, as described with respect to FIG. 1, an enhanced product customization service 102 may receive interest signals from a user device 122, by analyzing user activity 146, and/or directly from one of more web services 130. As a specific but non-limiting example, the system may analyze web browsing activity of the user to determine that the user is interested in the SEATTLE SEAHAWKS.

At block 603, the system may analyze search query data to determine an intention of the user to acquire a product. For example, the system may determine that the user intends to acquire a specifically identifiable product such as, a specific water bottle. Alternatively, the system may determine that the user intends to acquire a product from a particular product category without identifying any specific product, e.g., it may be determined that the user intends to purchase a water bottle but not which specific water bottle.

In some implementations, the interest signals may be generated based on user activity corresponding to a first user account whereas the search query data is generated based on user activity that corresponds to a second user account that is different than the first user account. As a specific example, the interest signals may be generated while a user is logged into a first user account that corresponds to the web search engine 132 and/or the social media platform 134. Then, the search query data 110 may be generated while the user is logged into a second user account that corresponds to the retail service 108. In some instances, the search query data 110 may be generated subsequent to the interest signals such that the system may identify the interest of the user even before the search query data 110 is generated. Ultimately, the system may analyze discrete instances of data (e.g., interest signals and/or search query data) that are generated at different times and/or through the user interacting with different user accounts and then, based on these discrete instances of data, determine how to customize products that the user may already intend to purchase in ways that haven't even been contemplated by the user.

In some implementations, the interest signals may correspond to one or more recurring activities such as, for example, receiving mail delivered magazines that are recurrently sent out at some interval (e.g., once a month, quarterly, etc.). As used herein, the term "recurring activity" refers to any activity that is recurrently performed by and/or for a particularly identifiable user. Exemplary recurring activities include, but are not limited to, a particular user listening to the same artist over and over on an online music service (e.g., SPOTIFY, etc.), receiving periodic mailing subscriptions (e.g., either through physical mail or electronic mail), frequently visiting websites related to a particular topic of interest, etc.

At block 605, the system may determine physical characteristics of the product or type of product that the user intends to acquire. For example, if the user intends to acquire a water bottle, then the system may determine one or more surfaces of the water bottle that are suitable for having graphics printed thereon.

At block 607, the system may determine product customization parameters for customizing the physical characteristics of the product based on the interest category. For example, as described in relation to FIG. 5, if the system determines that the user intends to purchase a set of cufflinks, the system may then determine product customization parameters for customizing a base set of cufflinks to be indicative of the interest category identified for the user.

Then, at block 609, the system may communicate aspects of a customized product that is customized based on the customization parameters to the user and/or customization facility. In some instances, communicating aspects of the customized product to the user may include causing the customized product to be preemptively manufactured and delivered to the user. In some instances, communicating aspects of the customized product to the user may include generating a notification 202 that includes a description and/or graphical representation of the customized product and, ultimately, transmitting the notification to the user.

In some instances, the system may identify a particular customization facility based on one or more of the products that it is determined the user intends to acquire, the category of product that it is determined the user intends to acquire, and/or the customization parameters. For example, if the user intends to purchase a specific water bottle that is manufactured and/or distributed by an existing customization facility, then the system may identify and select this customization facility. As another example, if the system determines customization parameters that call for "silk screening" a graphic onto a surface of a product, the system may identify a customization facility that is equipped to perform custom silk screening operations.

Figure 7:
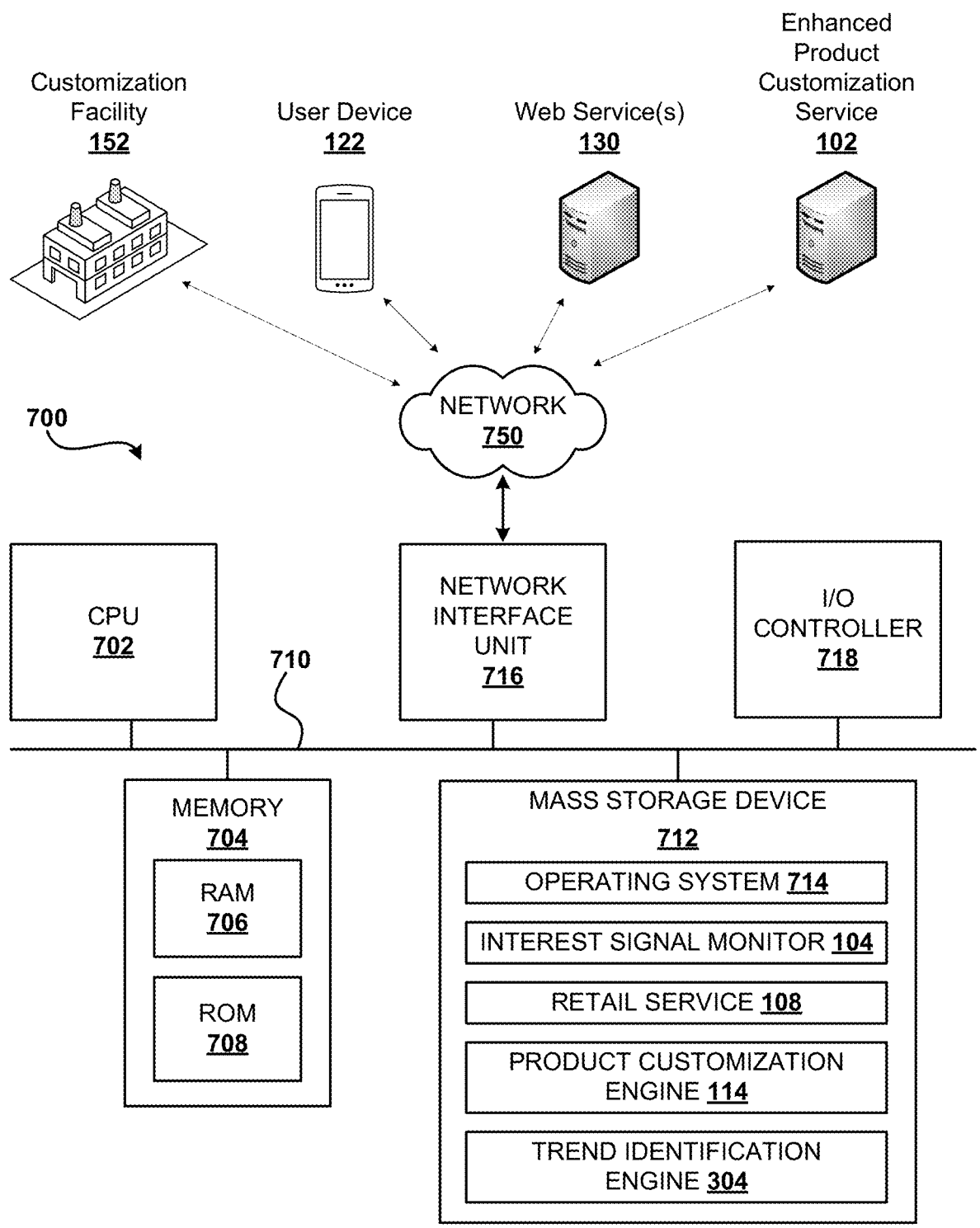
FIG. 7 shows additional details of an example computer architecture for a computer capable of executing the functionalities described herein.

FIG. 7 shows additional details of an example computer architecture for a computer capable of executing the functionalities described herein such as, for example, those described with reference to the enhanced product customization service 102, or any program components thereof as described herein. Thus, the computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. The mass storage device 712 may further include one or more of the interest signal monitor 104, the retail service 108, the product customization engine 114, and/or trend identification engine 304.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the enhanced product customization service 102, the user device 122, the web service(s) 130, and/or the customization facility 152 to communicate with one another.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
   one or more processors; and
   a memory in communication with the one or more processors, the memory having computer-readable instructions thereupon that, when executed by the one or more processors, cause the one or more processors to:
   obtain user credentials that enable authentication of a user with a web service, the web service comprising at least one of a search engine, a social media platform, or a mail service;
   identify, independent of user input, interest signals that indicate an association between the user and an interest category by monitoring user activity at the web service using the user credentials;
   identify, from the monitoring and independent of user input, search query data received by the web service from a client device associated with the user that indicates a threshold number of searches by the user for a product;
   determine physical characteristics of the product by:
      identifying a human hand depicted in a plurality of digital images depicting the product by performing image analysis on the plurality of digital images;
      assigning a dimension of an average size human hand to the human hand; and
      determining at least one dimension of the product by interpolating between a size of the human hand and a size of the product as depicted in the plurality of digital images using the assigned dimension;
   determine product customization parameters for customizing the physical characteristics of the product to generate a customized product in which the customized physical characteristics are indicative of the interest category; and
   generate a graphical representation of the customized product including the customized physical characteristics and cause output of the graphical representation at the client device associated with the user, independent of user input at the client device.

2. The system of claim 1, wherein the user activity includes at least one of social media consumption data describing consumption of data via the social media platform by the user or social media generation data describing data uploaded to the social media platform by the user.

3. The system of claim 1, wherein the search query data is generated in association with a first user account that corresponds to a retail service, and wherein the interest signals are generated in association with a second user account that corresponds to at least one of the search engine or the social media platform.

4. The system of claim 1, wherein the one or more processors are configured to identify the interest signals by detecting at least one recurring activity that corresponds to the interest category.

5. The system of claim 1, wherein the interest signals are identified based on an indication of a physical location associated with the client device when the search query data is received by the web service.

6. The system of claim 1, wherein the dimension of the average size human hand comprises at least one dimension of an average size male hand.

7. A method implemented by at least one computing device, the method comprising:
   obtaining user credentials that enable authentication of a user with a web service, the web service comprising at least one of a search engine, a social media platform, or a mail service;
   identifying, independent of user input, interest signals that indicate an association between the user and an interest category by monitoring user activity at the web service using the user credentials;
   identifying, from the monitoring and independent of user input, search query data received by the web service from a client device associated with the user that indicates a threshold number of searches by the user for a product;

determining physical characteristics of the product by:
  identifying a human hand depicted in a plurality of digital images depicting the product by performing image analysis on the plurality of digital images;
  assigning a dimension of an average size human hand to the human hand; and
  determining at least one dimension of the product by interpolating between a size of the human hand and a size of the product as depicted in the plurality of digital images using the assigned dimension;
determining product customization parameters for customizing the physical characteristics of the product to generate a customized product in which the customized physical characteristics are indicative of the interest category; and
generating a graphical representation of the customized product including the customized physical characteristics and causing output of the graphical representation at the client device associated with the user, independent of user input at the client device.

8. The method of claim 7, wherein the user activity includes at least one of social media consumption data describing consumption data via the social media platform by the user or social media generation data describing data uploaded to the social media platform by the user.

9. The method of claim 7, wherein the search query data is generated in association with a first user account that corresponds to a retail service, and wherein the interest signals are generated in association with a second user account that corresponds to at least one of the search engine or the social media platform.

10. The method of claim 7, wherein determining the physical characteristics further includes analyzing product data to determine dimensions associated with one or more outer surfaces of the product.

11. The method of claim 7, wherein identifying the interest signals comprises detecting at least one recurring activity that corresponds to the interest category.

12. The method of claim 7, wherein the interest signals are identified based on an indication of a physical location associated with the client device when the search query data is received by the web service.

13. The method of claim 7, wherein the dimension of the average size human hand comprises at least one dimension of an average size male hand.

14. A non-transitory computer-readable storage medium having instructions stored thereon that are executable by one or more computing devices to perform operations comprising:
  obtaining user credentials that enable authentication of a user with a web service, the web service comprising at least one of a search engine, a social media platform, or a mail service;
  identifying, independent of user input, interest signals that indicate an association between the user and an interest category by monitoring user activity at the web service using the user credentials;
  identifying, from the monitoring and independent of user input, search query data received by the web service from a client device associated with the user that indicates a threshold number of searches by the user for a product;
  determining physical characteristics of the product by:
    identifying a human hand depicted in a plurality of digital images depicting the product by performing image analysis on the plurality of digital images;
    assigning a dimension of an average size human hand to the human hand; and
    determining at least one dimension of the product by interpolating between a size of the human hand and a size of the product as depicted in the plurality of digital images using the assigned dimension;
  determining product customization parameters for customizing the physical characteristics of the product to generate a customized product in which the customized physical characteristics are indicative of the interest category; and
  generating a graphical representation of the customized product including the customized physical characteristics and causing output of the graphical representation at the client device associated with the user, independent of user input at the client device.

15. The non-transitory computer-readable storage medium of claim 14, wherein the user activity includes at least one of social media consumption data describing consumption of data via the social media platform by the user or social media generation data describing data uploaded to the social media platform by the user.

16. The non-transitory computer-readable storage medium of claim 14, wherein the search query data is generated in association with a first user account that corresponds to a retail service, and wherein the interest signals are generated in association with a second user account that corresponds to at least one of the search engine or the social media platform.

17. The non-transitory computer-readable storage medium of claim 14, wherein identifying the interest signals comprises detecting at least one recurring activity that corresponds to the interest category.

18. The non-transitory computer-readable storage medium of claim 14, wherein the interest signals are identified based on an indication of a physical location associated with the client device when the search query data is received by the web service.

19. The system of claim 1, wherein different ones of the plurality of digital images depict a different perspective of the product.

20. The non-transitory computer-readable storage medium of claim 14, wherein the dimension of the average size human hand comprises at least one dimension of an average size male hand.

* * * * *